United States Patent [19]

Clark

[11] 3,938,088
[45] Feb. 10, 1976

[54] CHARACTER CODING AND RECOGNITION SYSTEM
[75] Inventor: Harold E. Clark, Pittsford, N.Y.
[73] Assignee: Xerox Corporation, Stamford, Conn.
[22] Filed: Dec. 30, 1971
[21] Appl. No.: 214,282

[52] U.S. Cl............ 340/146.3 B; 197/156; 197/172; 235/61.11 E; 235/61.12 N; 250/226
[51] Int. Cl.²........................................ G06K 7/12
[58] Field of Search.......... 283/46, 47; 250/71, 226, 250/219 D; 235/61.11 E; 340/146.3 B; 197/172, 156; 101/115, 202

[56] References Cited
UNITED STATES PATENTS

| 2,947,357 | 8/1960 | Bafour et al. | 197/156 |
|---|---|---|---|
| 3,225,177 | 12/1965 | Stites et al. | 250/226 R |
| 3,473,027 | 10/1969 | Freeman et al. | 235/61.11 E |
| 3,486,006 | 12/1969 | Siegel | 197/172 X |
| 3,555,852 | 1/1971 | Stock et al. | 340/146.3 B |
| 3,578,136 | 5/1971 | Postal | 197/172 |
| 3,663,801 | 5/1972 | Wahli | 235/61.11 E |
| 3,786,237 | 1/1974 | Postal | 340/146.3 B |

Primary Examiner—Leo H. Boudreau
Attorney, Agent, or Firm—James J. Ralabate; Michael H. Shanahan; George J. Cannon

[57] ABSTRACT

Coding of a group of characters for recognition by a machine and by a human viewer is provided by coloring each character with a predetermined plurality of colors arranged in predetermined locations within a character configuration. Each character configuration in a set of characters is segregated into a plurality of sectors and each sector is coded by a predetermined one of a plurality of colors which differs from the color coding of an adjacent sector. Apparatus for forming the color-coded characters by printing and by a photoelectrophoretic process is disclosed. Apparatus for automatically recognizing characters colored according to the predetermined code comprise color detecting elements positioned in an array at a reading station for generating output electrical signals representative of the color-sector coding and circuit means coupled to the detection means for translating the color-sector signals into an electrical signal representative of a character in a set.

1 Claim, 18 Drawing Figures

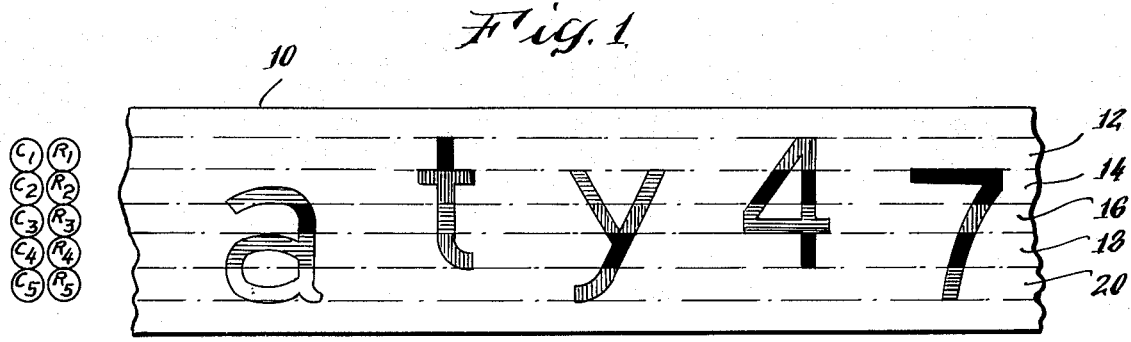
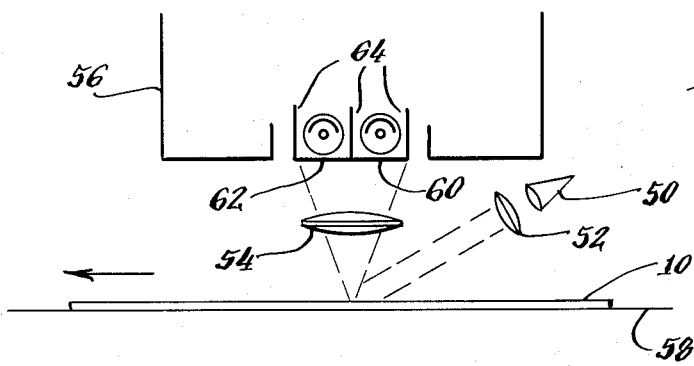
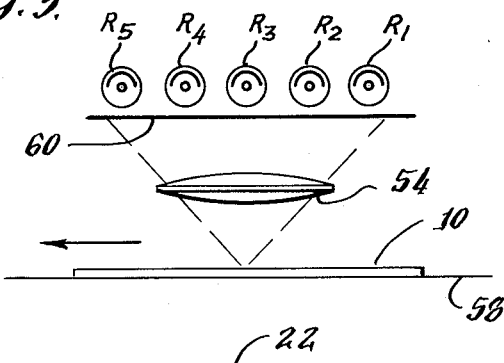
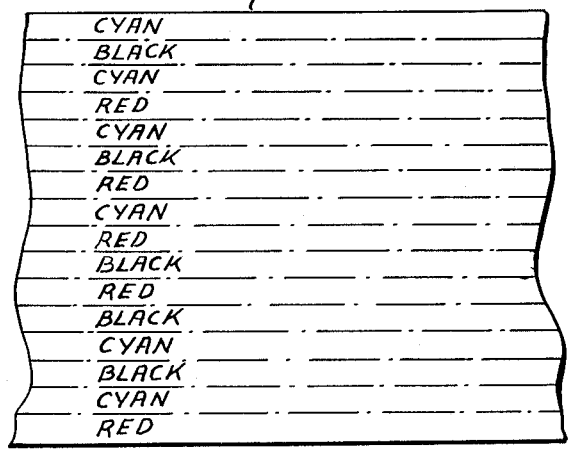
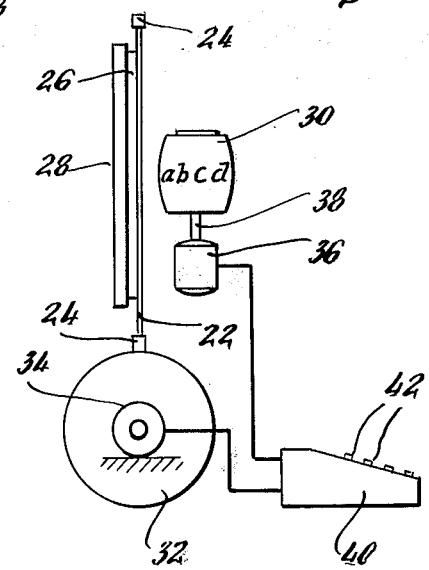

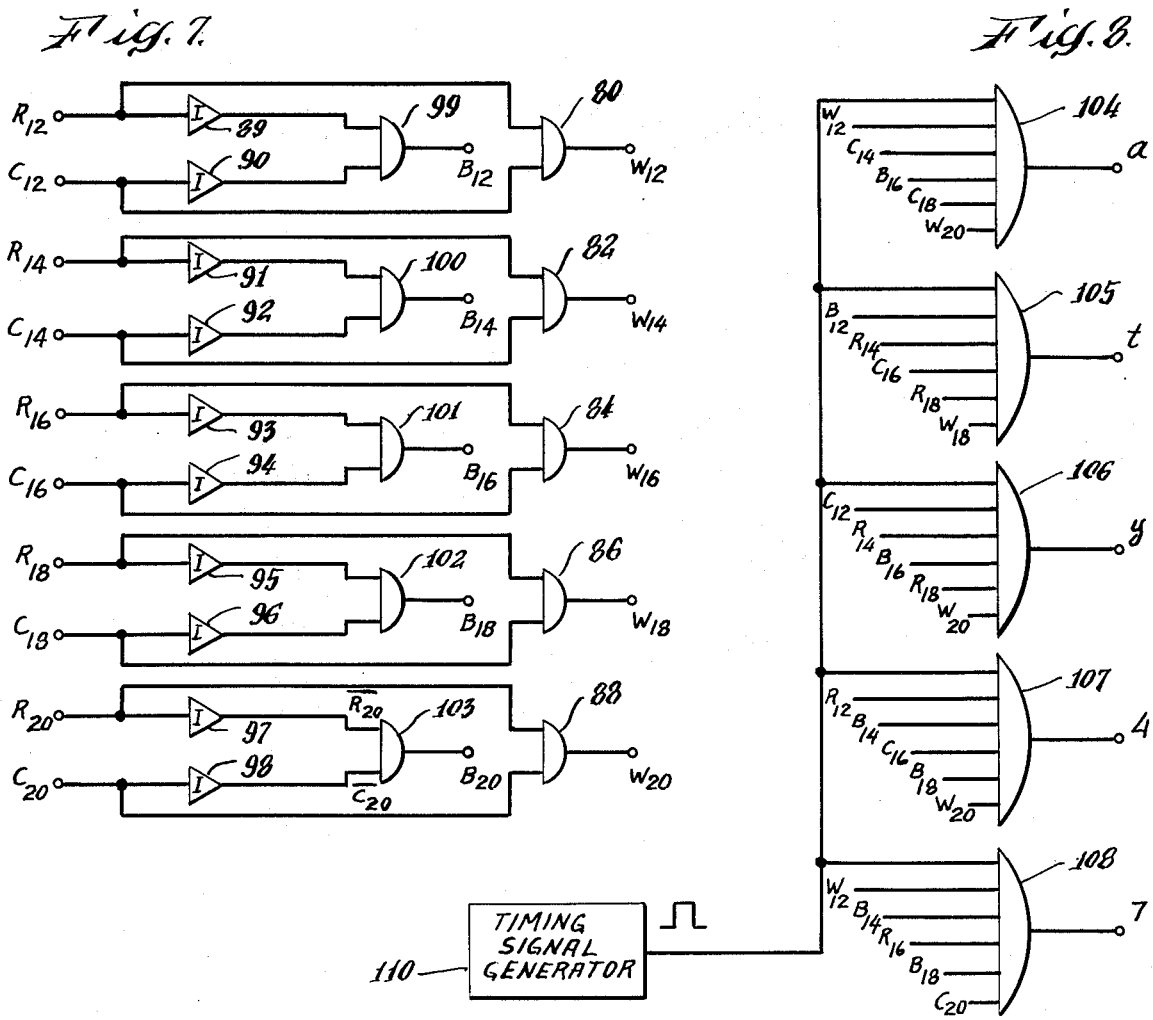

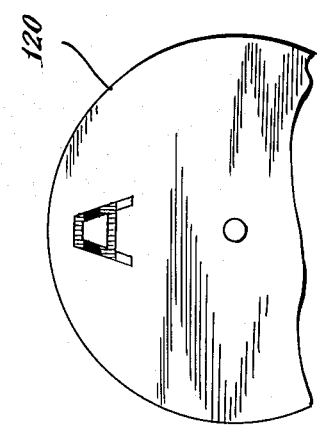
Fig. 10.
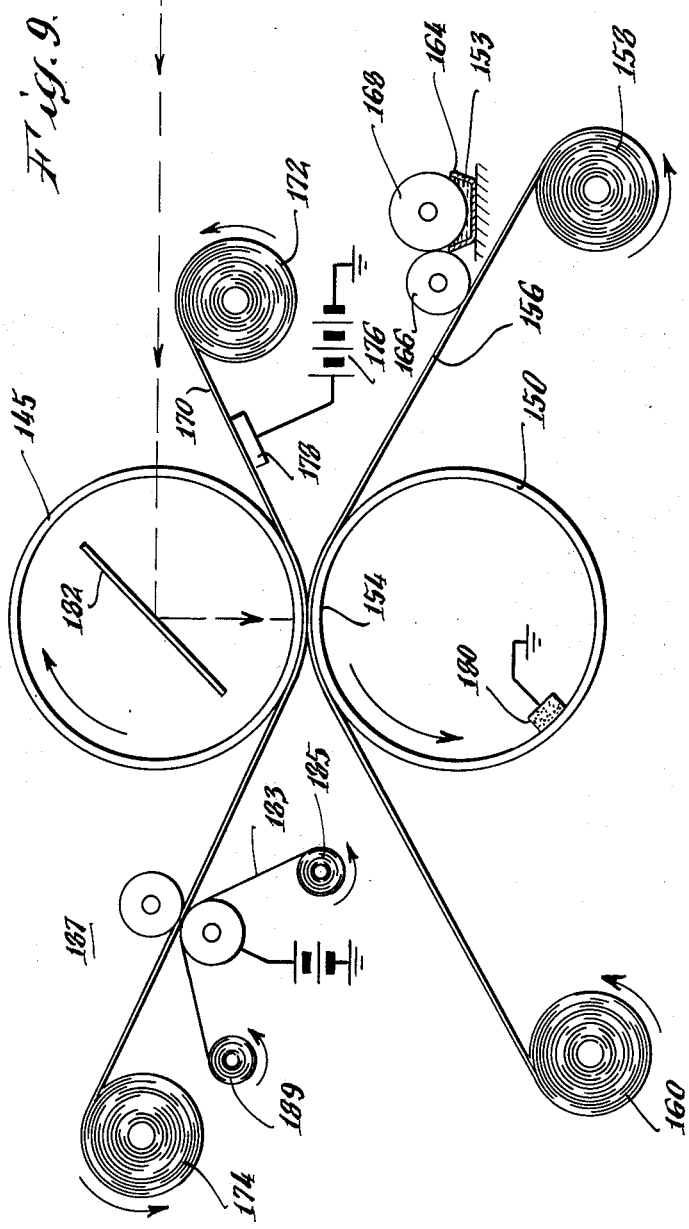
Fig. 9.
| | RED | GREEN | BLUE |
|---|---|---|---|
| RED | X | | |
| CYAN | | X | X |
| MAGENTA | X | | X |
| BLACK | | · | |
| WHITE | X | X | X |
Fig. 13.
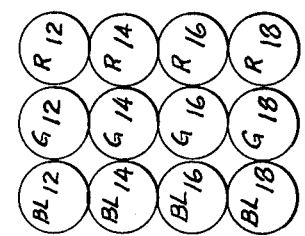
Fig. 12.

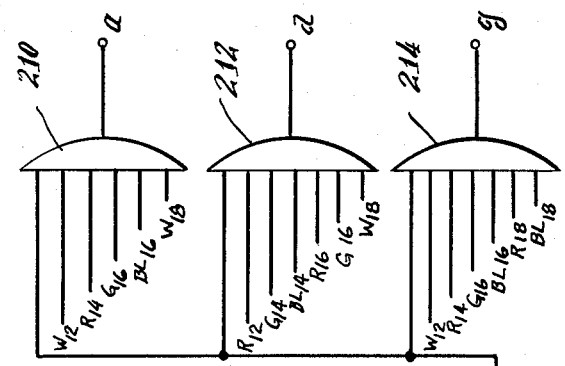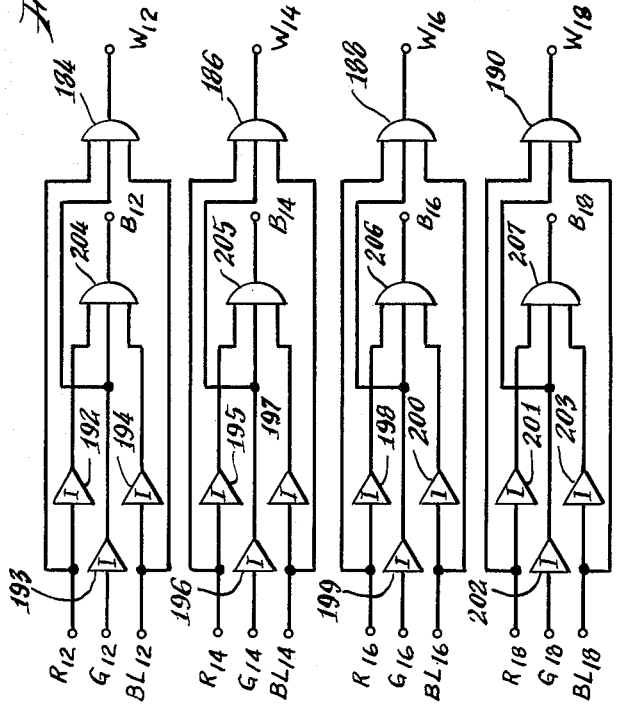

CHARACTER CODING AND RECOGNITION SYSTEM

This invention relates to data input arrangements for a data processing system. The invention relates more particularly to an improved character recognition system for recognizing color coded characters.

In various data handling operations, the need exists for transmitting data in a form which is both recognizable by machine and readable by individuals. Information presented in a form which satisfies these requirements permits use of the information by an individual in the performance of limited tasks and additionally provides for high speed recognition and processing by automatic equipment.

A known system of character presentation which satisfies these general requirements employs characters of conventional configuration which are color coded. An individual visually scans the data and recognizes the characters presented by virtue of the familiar shape of the characters while data processing equipment which is employed for high speed processing of information recognizes the characters by virtue of the color coding of the characters. Each of the characters is coded with one or more colors and automatic detection means are provided for sensing different character colors and for generating a digital output indication which is representative of the color or combination of colors and therefore of the character detected. In a known arrangement, each detector includes a photosensitive element and a color filter which are arranged for surveying an entire character for the presence of color coding associated with the absorption characteristics of the filter.

A detection arrangement of the type described exhibits several limitations which reduce its operational effectiveness. In practice the characters are preferably formed on a white or other light colored record medium background and illumination of a character results in reflection of light from the record medium as well as from the character. Light components reflected from the record medium which correspond to a color being detected can and often do result in the production of an erroneous output indication. In addition, the indexing of, or proper placement of a color coded character at a station for reading has not been accomplished in prior arrangements with a high degree of accuracy and this further contributes to the generation of false signals. These limitations substantially restrict the reliability of a character recognition system of the type wherein the characters are color coded. Furthermore, means for producing or reproducing color coded characters tends to be relatively complex and costly.

Accordingly, it is an object of this invention to provide an improved character recognition system of the type wherein the characters are color coded and are recognizable both by an individual and by a machine.

Another object of the invention is to provide a relatively non-complex character color coding detection arrangement which enhances the reliability of the machine readability of the characters.

Another object of the invention is to provide a character color coding arrangement which reduces the cost and complexity of equipment required for automated recognition of these characters.

A further object of the invention is to provide improved means for creating color coded characters.

In accordance with the general features of the present invention, coding of a group of characters for recognition by a machine and by an individual is provided by coloring each character with a predetermined plurality of colors arranged in predetermined locations within a character configuration. Each character configuration in a set of characters is segregated into a plurality of sectors and each sector is coded by a predetermined one of a plurality of colors which differs from the color coding of an adjacent sector. In a particular embodiment of the invention, coding of a set of alpha-numeric characters is provided by dividing each character into an array of parallel bands each of which extends across a dimension of the character and coloring each of the bands with a predetermined one of a plurality of colors. A plurality of alpha-numeric characters is printed by an apparatus having a multi-band ribbon or tape, positioned between a record medium and a printing character. Means are provided for varying the tape location with respect to a printing character in order to position a plurality of bands of preselected colors corresponding to a color code for a character to be imprinted between the printing character and the record medium. In accordance with another embodiment of the invention, color coded characters having a predetermined multiband color code are formed by a photoelectrophoretic process. Apparatus for automatically recognizing characters colored according to the predetermined code comprise color detecting elements positioned in an array at a reading station for generating output electrical signals representative of the color band coding and circuit means coupled to the detection means for translating the color-sector signals into an electrical signal representative of a character in a set.

These and other objects and features of the invention will become apparent with reference to the following specification and to the drawings wherein:

FIG. 1 is a plan view of a record medium having color coded characters and a character recognition means arranged in accordance with the invention;

FIG. 2 is an elevation view of the character recognition arrangement of FIG. 1;

FIG. 3 is a side view of the character recognition arrangement of FIG. 2;

FIG. 4 is a schematic diagram of an apparatus for forming the color coded characters of FIG. 1;

FIG. 5 is a front view of a printing tape of FIG. 4 having a plurality of color bands for printing a color coded character;

FIG. 6 is a diagram illustrating an alpha-numeric color code format printed with the tape of FIG. 4;

FIG. 7 is a logic diagram illustrating the generation of white and black signals for use in recognizing characters which are color coded in accordance with the format of FIG. 6;

FIG. 8 is a logic diagram illustrating the logical functions performed in the recognition of particular characters which are color coded in accordance with the format of FIG. 6;

FIG. 9 is a diagram of an apparatus for photoelectrophoretically forming color coded characters in accordance with the present invention;

FIG. 10 is a side view of a portion of a character disc employed with the apparatus of FIG. 9 and illustrating a color coded character;

FIG. 11 is a diagram illustrating an alternative color coding format which is printed by the apparatus of FIG.

Figure 16:
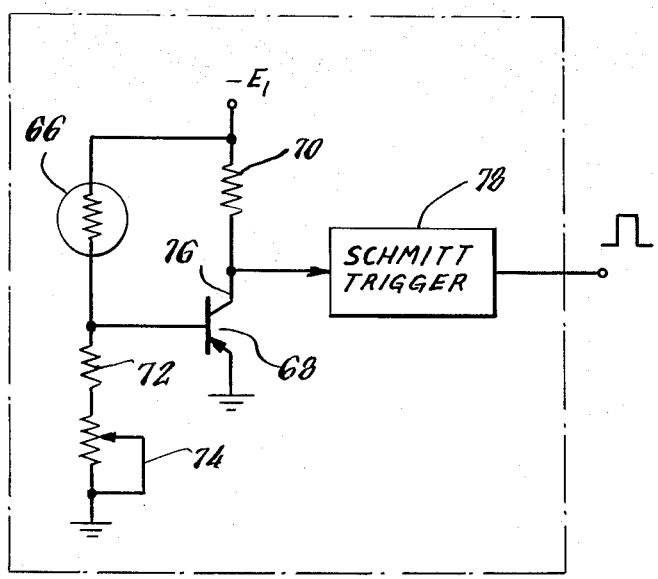
Figure 17:
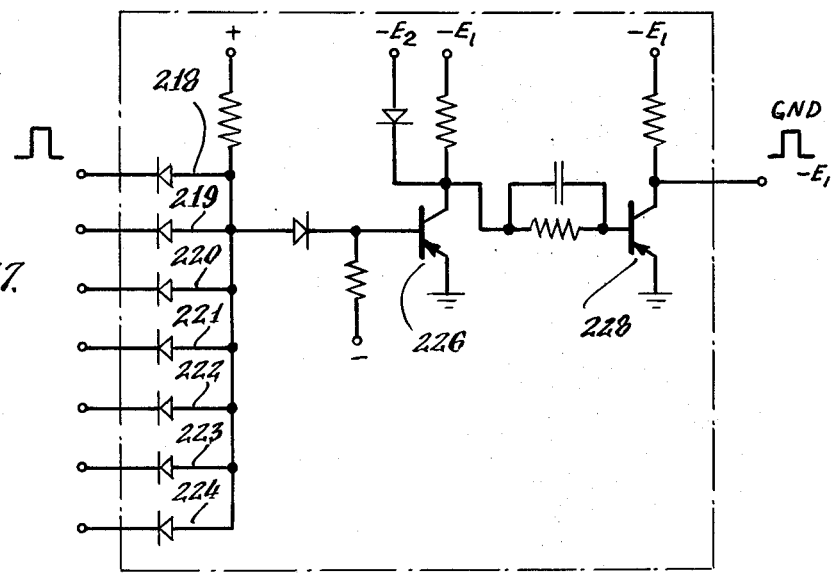
Figure 18:
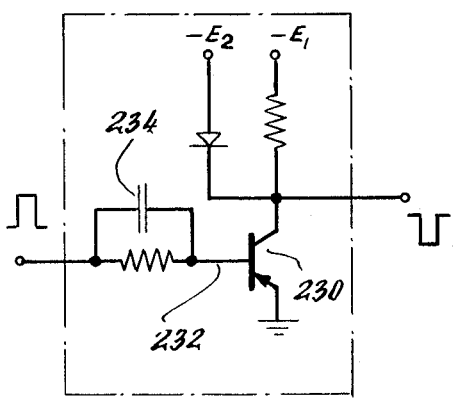

9 in accordance with the invention;

FIG. 12 is a diagram of a photodetector array utilized in a detecting and translating apparatus for recognizing the color coded characters produced by the apparatus of FIG. 9;

FIG. 13 is a diagram illustrating the conversion of primary colors in an additive color system to primary colors, and to black and white, in a subtractive color system;

FIG. 14 is a logic diagram illustrating the electrical conversion of the primary colors in an additive color system of FIG. 13 to black and white;

FIG. 15 is a logic diagram illustrating the logical functions performed in the recognition of particular characters which are color coded in accordance with the format of FIG. 11;

FIG. 16 is a circuit diagram partly in block form illustrating a character recognition element of the detector array of FIGS. 1–3 and of FIG. 12;

FIG. 17 is a circuit diagram of an AND gate employed in the logic arrangements of FIGS. 7, 8, 14, and 15; and, FIG. 18 is a circuit diagram of an inverter circuit employed in the logic arrangement of FIGS. 7 and 14.

Referring now to FIG. 1, there is shown a record medium 10 comprising a sheet of paper, a paper tape, a paper card or other similar body of material having alpha-numeric characters formed thereon. These characters are recognizable both automatically with data processing apparatus and by an individual through normal viewing of the record medium. The record medium is divided into a plurality of elongated parallel extending sectors or bands 12, 14, 16, 18 and 20, each of equal width. Each of the bands in a character is colored by a choice of one of a plurality of colors in accordance with a predetermined code. The characters are recognizable by a human viewer by virtue of their familiar configuration while, as indicated in greater detail hereinafter, the characters are recognizable automatically with automatic reading apparatus by virtue of the predetermined coding of colors present in each respective band. Characters which are color coded as indicated can be formed on the record medium 10 through printing techniques including printing apparatus such as a typewriter having a multiband ribbon and by electrophoretic printing apparatus, both of which are described in more detail hereinafter. Alternatively, the color coded characters can be formed by hand.

A color coding format for providing color coding of 26 lower case English script characters along with 10 numeric characters is illustrated in FIG. 6. This format is particularly applicable for use with a coding apparatus which employs a multiband color ribbon or tape 22 as illustrated in FIG. 5. In forming these characters, the position of the ribbon with respect to a character printing head 30 is varied in order to provide at a location opposite the printing head a plurality of color band code combinations each of which is associated with a character in the set. The color bands shown in FIG. 5 extend horizontally and the tape position is varied in a vertical direction. The tape 22 is positioned for providing that at least three bands of the tape such as bands 14, 16 and 18 are positioned opposite a printing character such as is illustrated for the character *a* in FIG. 1. Certain of the lower case English characters have a greater height than others and extend vertically into an upper band 12 as illustrated by the character *t* in FIG. 1, or, into a lower band 20 as illustrated by the character *y* in FIG. 1. More particularly, the lower case characters *a, c, e, i, m, n, o, r, s, u, v, w, x* and *z* comprise 14 characters of the same general height. In addition, there are 12 alphabetic characters of relatively greater height, six of which include segments extending upward into band 12 and six of which include segments extending downward into band 20. The former comprise the letters *b, d, h, k, l* and *t* while the latter comprise the letters *f, g, j, p, q* and *y*.

As indicated, these characters are color coded in accordance with one embodiment of the invention through the use of the ribbon or tape 22 having the continuous color bands shown in FIG. 5. This tape includes bands of the colors cyan, black and red and is arranged to provide permutations of sequences of these colors wherein color bands of a same color are not contiguous. Twelve of the above enumerated 14 lower case characters are printed with the tape 22 having the permutations and sequences illustrated in FIG. 5 by vertically raising this ribbon adjacent the printing head 30 to 12 different positions so that at each of the 12 positions three color bands are positioned adjacent a printing character of the head. When a one of the six upward elongated lower case characters is printed at one of the 12 positions, four stripes will be contacted and four color bands will be printed having a configuration of this character. Similarly, each of the six lower case downward elongated characters is printed with four stripes.

The tape illustrated in FIG. 5 provides for a total of 12 combinations of three color bands illustrated by the bands 14, 16, and 18 of FIG. 6, 12 combinations of four color bands illustrated by the bands 12, 14, 16 and 18 of FIG. 6, and 12 combinations of four color bands illustrated by bands 14, 16, 18 and 20 of FIG. 6. Thus, 26 distinct combinations are available for color coding alpha-numeric characters with a tape as illustrated in FIG. 5. It is noted from the color coding format of FIG. 6 that the number of lower case characters which can be coded by three color bands exceeds the number of available three band combinations by two characters. In the format shown in FIG. 6, the lower case characters *m* and *u* have been modified to include extended lower leading edges and are coded by the four bands 2, 3, 4, and 5. Additionally, the format illustrates the numeric characters 1, 2, 3, 4, 5 and 0 printed by four stripes in bands 12, 14, 16 and 18 while the numeric characters 6, 7, 8 and 9 are printed by four stripes and bands 14, 16, 18, and 20.

A printing apparatus employing a color coding tape is illustrated in FIG. 4. The printing apparatus include means for transporting the ribbon 22 through 12 vertical locations. The ribbon 22 is mounted in a frame 24 and is positioned between a record medium 26 and a printing body 30. The printing medium comprises for example sheet paper 26 or alternatively a tape or card which is backed by a platen 28. The printing body comprises a rotatable globular shaped printing head 30 having 26 raised alpha-numeric characters formed thereon. Both the ribbon tape 22 and the paper tape record medium 26 are fed to, and, advanced through a printing station by conventional means, not illustrated. Vertical motion of the ribbon frame 24 is effected by a cam 32 which is rotated to a selected one of 12 positions by a stepping motor 34 which is mechanically coupled to a rotary shaft of the cam 32. The globular printing head 30 is similarly rotated about its axis to 26 positions by a stepping motor 36 which is coupled to the globe 30 through a shaft coupling 38. The stepping motors are actuated from an operator's print select console 40 which includes 26 alpha-numeric select buttons 42. Depression of an alpha-numeric select button 42 causes the stepping motor 34 to rotate the cam 32 to a one of 12 positions and the motor 36 to rotate the globe 30 to a one of 26 circular positions at which the stripes of the tape 22 correspond to the color coding for an alpha-numeric character to be printed. The head 30 is then forced against the tape 22 and printing medium 26 for printing the selected character by conventional means not illustrated. The operation of stepping motors and means for causing this selective movement are well known in the art. While it is not shown in detail, it is understood that the console 40 includes conventional electronic responsive devices for controlling the operation of motors in accordance with the depression of a particular alpha-numeric select button 42. More particularly, a digital binary register having 12 and 26 output combinations can be provided and coupled to the stepping motors 34 and 36 respectively. Depression of an alpha-numeric select push button 42 will set the register to a condition for establishing an output for causing the stepping motors to rotate the cam and the printing globe to preselected positions. Typical registers comprise a shift register or a ring counter. The means for triggering these registers into a predetermined state are well known and further elaboration is believed unnecessary.

An array of detecting elements for detecting alpha-numeric characters color coded in accordance with the color coding format of FIG. 6 is illustrated in FIG. 1. Two detection elements, each capable of detecting a single one of the two code colors cyan and red and for generating signals indicative of a black code color are aligned with each of the bands 12 through 20. These cell pairs provide an output signal when a one of these colors appears in a character in the associated band. For example, the elements $R_2$ and $C_2$ are aligned with the band 14 and an output will be generated by one or both of these elements when a character is located at the sensing station. Similarly, the elements $R_3$ and $C_3$ are aligned with band 16 and the elements $R_4$ and $C_4$ are aligned with the band 18 and output signals will be generated by these elements in accordance with the color coding of the character in the associated band when a character is properly located at a sensing station. In addition to the detecting elements aligned with bands 14, 16 and 18 sensing elements $R_1$ and $C_1$ are aligned with a band 12 and elements $R_5$ and $C_5$ are aligned with a band 20. An output signal will be generated by one of the elements aligned with band 12 when one of the upper elongated lower case characters $b$, $d$, $f$, $h$, $k$, $l$ and $t$ is positioned at the sensing station. Similarly, an output signal will be generated by one of the elements aligned with the band 18 when the lower elongated lower case letters $g, j, p, q$ and $y$ as well as the modified characters m and n are positioned at the sensing station. As viewed in FIG. 1, the record medium 10 is advanced to provide the positioning of a character at a sensing station within detection range of each of these elements and an appropriate output indication will be provided.

Advancement of the record medium is provided by a conventional transport, not shown, for stepwise or continuous advancement of the record medium. The transport includes guides for establishing and maintaining alignment between the record medium and the detector array. Advancement can be effected with a sprocket drive in which case the record medium includes sprocket drive holes. Alternatively, a conventional friction drive arrangement can be provided.

In FIG. 2, the elevated position of the array of detecting elements with respect to the record medium is illustrated. A lamp 50 is provided along with a lens arrangement 52 for illuminating an area beneath the photodetectors at which position a character is to be sensed. An illuminated character at this station is then focused on the array of photocells by a lens 54. The detecting elements comprise photocells which are mounted in a housing 56 and are spaced from a support table 58 upon which the record medium 10 is advanced. Photocells of different color coding bands which detect a same color are aligned in a column as viewed in FIG. 1 and an absorption filter strip is positioned between the lens 54 and these photocells for absorbing the color of interest. Absorption filter strips 60 and 62 are provided for absorbing the color of interest associated with the columnar array of red and cyan photocells. The absorption filters cause a decrease in the illumination falling on their associated photocells for a color being sensed and the photocell provides a corresponding electrical indication. In order to reduce the responsiveness of cells to undesired reflections and other like interferences, each of the cells is masked by a shade 64.

A detection element and signal generating means for the detector array of FIG. 1 is shown in detail in FIG. 16. The detection element comprises a photocell 66 which may be of the cadmium sulfide photoconductive type. This photocell is coupled in a bias circuit of a PNP transistor amplifier. The transistor 68 which is shown coupled in a common emitter amplifier configuration includes a resistive collector impedance 70. A base electrode bias current is provided for the transistor 68 by a voltage divider which includes the resistive impedance of the photoconductive device 66, a resistance 72 of fixed impedance and a variable resistance 74. As the illumination incident on the photocell 66 decreases, its resistive impedance will increase thereby raising the base electrode to emitter electrode bias and causing the voltage at a collector electrode 76 to become more negative. At a predetermined collector voltage level, a conventional Schmitt trigger circuit 78 which is coupled to transistor 68 will be triggered. The Schmitt trigger circuit, as is well known, is a voltage level sensitive circuit. Upon triggering, the circuit 78 generates a positive output voltage which is coupled to a signal translating circuit arrangement described in detail hereinafter. The bias level of the transistor 68 is adjustable in order to compensate for variations in background illumination falling on the photodetector. This adjustment is provided by manually varying the impedance of the resistance 74. Alternatively, the photocell and amplifier may be arranged in a well known bridge circuit which exhibits less sensitivity to background illumination. In addition, noise filtering circuit means can be employed between the output of the transistor 68 and the Schmitt trigger circuit 78.

The logic diagrams of FIGS. 7 and 8 illustrate logical operations which are performed in translating detector signals derived from a ribbon coded record medium into electrical outputs representative of the characters being detected. The three code colors, namely red, cyan and black of the ribbon printing arrangement when associated with the five bands 12, 14, 16, 18 and 20 of the record medium and subject to the restriction of noncontiguous colors in adjacent bands provide for the encoding of 26 characters as illustrated in FIG. 6. Detector cells are provided for sensing for the presence of the colors red and cyan in each band while detection of the color black in a band is accomplished electrically by sensing for the simultaneous absence of the colors red and cyan in the band. The ribbon coding arrangement relates three predetermined colors with either three or four of the five bands. As a result each character code includes an uncolored band. This is illustrated in FIG. 6 for the character $a$ by bands 12 and 20, for the letter $b$ by band 20, etc. Although this coding system simplifies the tape encoding apparatus, i.e. it reduces the number of different color bands required on the tape and the number of vertical positions through which the ribbon is transported, a same color code and sequence can exist for different characters although in displaced bands. An ambiguity can therefore arise such as is illustrated by the coding of the letters $b$ and $f$ in FIG. 6. This ambiguity is overcome during detection by employing a record medium whose color can be sensed through the electrical combination of existing color signals. With respect to the ribbon-coding arrangement which provides a code format as shown in FIG. 6, a white record medium is employed. As is well known, the colors red and cyan combine to form the color white. The output signals of the red and cyan detectors are therefore employed in each band to sense for the presence of the color white.

FIG. 7 is a logic diagram illustrating the generation of white and black signals. The red and cyan signals for the bands 12, 14, 16, 18 and 20 are applied to associated AND gates 80, 82, 84, 86 and 88 respectively. The red and cyan signals are identified by color reference letter R or C followed by a subscript 12, 14, 16, 18 or 20 associated with a band. An output from these gates indicates the presence of the color white in a band of a character being sensed. The absence of both a red and a cyan signal indicates the presence of the color black. The color black is sensed by inverting the red and cyan signals to provide $\overline{red}$ and $\overline{cyan}$ signals. Inversion is provided by inverter amplifiers 89–98. The output of these amplifiers are then applied to AND gates 99–103.

FIG. 8 which illustrates a logic translating arrangement for translating color-sector signals into a signal representative of an alpha-numeric character is shown to include AND gates 104, 105, 106, 107 and 108. Red and cyan input signals to these gates are coupled thereto from the detector elements of FIGS. 1–3. Similarly, white and black signals from the logic unit of FIG. 7 are coupled to these gates. An output signal will be provided by one of these AND gates when all inputs exist simultaneously at a particular gate in time coincidence with a timing signal which is derived from a timing signal generator 110. The generator 110 comprises a conventional triggered multi-vibrator unit arrangement which is synchronized generally with the tape reading drive apparatus referred to hereinbefore. The timing signal generates a signal which enables the AND gates 104–108 when a character is properly positioned for reading. Each of the AND gates 104–108 have inputs in accordance with the color sector code of Table 6 for sensing the three alphabetic characters $a, t, z$ and two numeric characters, 4 and 7 which were shown recorded in the record medium of FIG. 1. For purposes of simplifying the disclosure and the drawings, the AND gates for sensing the coding of the remaining 21 alpha-numeric characters are not shown.

However, it is understood that they operate in a similar manner with input signals from the detector array and logic unit of FIG. 7 as enumerated by Table 1. The signal from an output terminal of each of these AND gates is in the form of a voltage level which is employed to actuate other utility equipment, not shown, or to set a memory device such as a bistable device, for example, for storing the information. The data can then be used in a data processing arrangement for interpreting the information.

An alternative format for color coding characters in accordance with this invention is illustrated in FIG. 11. In this arrangement, the four colors red, cyan, magenta and black are employed as code colors. Four bands i.e., 12, 14, 16 and 18 are employed with this format to provide a relatively larger number of code combinations than was provided with the format of FIG. 6. This is accomplished by utilizing printing apparatus which in this embodiment is not restricted to the use of sequences of colors as was provided with the color-coding tape of FIG. 5. The four color band coding arrangement of FIG. 11 provides for color coding 26 lower case alphabet characters, 26 upper case alphabet characters, 10 numeric characters, and, in addition provides 22 remaining combinations which can be utilized for other characters. In this format, the lower case letters $a, c, e, i, n, o, r, s, v, w, x$ and $z$ are color coded in the two central bands, bands 14 and 16. The elongated, upper extending, lower-case characters $b, d, h, k, l$ and $t$ are color coded in bands 12, 14 and 16. Similarly, the lower-case, elongated, lower-extending characters, $f, g, j, p, q$ and $y$ are color coded in the bands 14, 16 and 18. The lower case letters $m$ and $u$ are color coded in the bands 14, 16 and 18 also. All upper case characters are color coded in bands 12, 14 and 16 while the numeric characters are color coded in bands 14, 16 and 18.

The large number of color coding combinations presented in FIG. 11 can be produced in accordance with a feature of this invention with a polychromatic photoelectrophoretic (PEP) imaging system. In a polychromatic (PEP) system, an image is produced by disposing a suspension of colored photosensitive pigmented particles in an insulating carrier liquid between injecting and blocking electrodes. These particles are exposed under light in accordance with a desired image configuration while an electric field is simultaneously established between electrodes. The exposed pigment particles in one embodiment migrate through the insulating liquid toward a receiving surface of the blocking electrode and adhere to the receiving surface forming a negative image thereon. The receiving surface and suspension are then removed leaving behind a positive pigment image on the surface of the injection electrode. A positive image remaining on the injection electrode can be fixed on the electrode or alternatively the positive image can be transferred to, and fixed on, another receiving surface. A transfer to another surface may be effected with an adhesive pickoff for example, or, it can preferably be accomplished with electrostatic field transfer techniques. Electrostatic field transfer to another surface is provided subsequent to the above desired imaging step by introducing an intermediate receiving surface between the electrodes and reapplying a potential which is of a polarity opposite to that employed during the imaging step.

Reproduction of the image in color with a polychromatic photoelectrophoretic process is provided by employing different colored photosensitive pigmented particles which exhibit desired spectral responses and by exposing the material to an image configuration in color. In an exemplary arrangement, the pigmented particles may comprise a mixture of red, magenta and cyan colored particles. A polychromatic photoelectrophoretic imaging system of this type is described in U.S. Pat. Nos. 3,384,488 and 3,384,565, the disclosures of which are incorporated herein by reference.

An imaging system employing polychromatic PEP techniques for generating a color code in accordance with the format of FIG. 11 is illustrated in FIGS. 9 and 10. The system employs a rotating disc 120 which has formed thereon a plurality of circumferentially spaced alpha-numeric characters. The 26 lower case and the 26 upper case alphabet characters as well as the 10 numeric characters of the format of FIG. 11 will be spaced circumferentially about the disc. These characters may be formed on the disc, for example, by shearing or stamping a character configuration from the disk or by other mechanical forming process. FIG. 10 illustrates the upper case letter A formed in the disc. Each of the characters is color coded by a translucent plastic film positioned over the character cutout in the disk which establishes the sector color coding for each of the characters. For example, with respect to the upper case letter A of FIG. 10, a transparent plastic film having the colors red, black and red formed to establish these code colors in bands 12, 14 and 16 is mounted by an adhesive, for example, over the character cutout. Other characters in this set are color coded in accordance with the color coding format of FIG. 11. Thus, a set of alpha-numeric characters which are color coded are formed and arranged in a circle about the disc 120. The disc is mounted on a shaft 122 which is rotated by a stepping motor 124. The stepping motor 124 is coupled to an operating console 126 having a plurality of alpha-numeric select push buttons 128. By depressing a selected alpha-numeric push button, the stepping motor 124 rotates the disc and positions a selected character at a station aligned with a beam of light 130. The beam of light is provided by a lamp 132 and a lens 134 which focuses the light output from the lamp on the character at the reading station. The lamp 132 preferably provides a white light output and the color coded character on the disc 120 is thereby projected at a receiving surface in the PEP imaging apparatus. The operation of the stepping motor 124 and the operating console 126 have been described hereinbefore with respect to FIG. 4. The lamp 132 is synchronized with the rotation of the disc 120 for providing that the lamp illuminates the character at the reading station when the character is properly positioned. This is accomplished by the provision of sensing contacts at the disc, not shown. Alternatively, lamp synchronization is effected by providing means for interrupting electrical energization of the lamp 132 when the stepping motor is being rotated.

The polychromatic photoelectrophoretic recording apparatus includes a pair of cylinders, 150 and 145, in whose nip the electrophoretic materials undergo processing. Cylinder 145 is transparent in order that exposure can take place through it. Cylinder 150 is conductive. A polychromatic photoelectrophoretic recording medium 153 is transported to a recording station 154 by a continuous strip of Mylar tape 156 which is fed from a supply reel 158. The tape is drawn over the drum 150 and is taken up by a reel 160. One surface of the tape 156 is coated with the polychromatic photoelectrophoretic recording material 153 which is contained in a reservoir 164. This material is deposited on the tape 156 by an applicator roller 166 which in turn is coated by a transport roller 168. The transport roller 168 is partially in contact with the material 153 in the reservoir 164. The polychromatic photoelectrophoretic material 153 comprises a suspension of polychromatic photosensitive particles in an insulating carrier liquid. Typical polychromatic photoresponsive materials include substituted and unsubstituted organic pigments as for example phthalocyanines such as Monarch Blue G beta crystalline form of copper phthalocyanine available from Hercules, Inc., and quinacridones and pigments such as Watchung Red B and Algol Yellow G.C. A more complete list of photosensitive pigments is described in the aforementioned U.S. Pat. No. 3,384,488. Typical insulating liquids include decane, dodecane, tetradecane, Sohio Solvent 3454, a kerosene fraction available from Standard Oil Company of Ohio.

An optically transparent, electrically conductive strip of tape 170 is fed from a supply roller 172 and is drawn along an outer surface of the drum 145 in contact with the suspension 153 which is coated on the surface of the tape 156. The tape 170 may, for example, comprise a thin sheet of polystyrene or polyethylene having deposited thereon a thin film of tin oxide. The polychromatic photoelectrophoretic recording medium 153 is thus sandwiched between the surfaces of the tape 170 and the tape 156 at the recording station 154.

In a photoelectrophoretic imaging system, an image is formed from the imaging suspension by subjecting the suspension to an electric field while simultaneously exposing the suspension to activating electromagnetic radiation such as visible light. In FIG. 9, an electric field is established by a source of potential shown to be a battery 176 having a positive terminal thereof coupled by a contact member 178 to the conductive surface on the tape 170, that surface being in contact with the photophoretic imaging material on the surface of tape 156. The conductive drum 150 is coupled to a negative common ground connection. A relatively positive potential is therefore established between the injecting electrode and the blocking electrode. A character to be recorded in accordance with the color coding format of FIG. 11 is projected from the disc 120 toward a reflective body 182 from which it is then reflected toward the recording station 154.

Under the action of the field, the particles, which are primarily negative, will be attracted to tape 170. When they are exposed to light, the particles, in accordance with one theory, exchange charge with the injecting electrode and migrate under the influence of the electric field through the carrier liquid to tape 156. Particles which absorb the colors present in the projected image thereby are removed from tape 170. Conversely those remaining on tape 170 constitute a positive photographic colored reproduction of the characters forming them. The tape 170, carrying these positive images away from the exposure and image forming stage, then contacts a paper tape, web or sheet 183 which is supplied by a reel 185. The web 183 is transported to an electrostatic image transfer station 187 and is then taken up by a reel 189. The web 183 now carries away the positive color copy of the characters presented at the imaging stage. The image can be fixed to the web, for example, by heat fixing. A reel 174 takes up the discarded tape 170.

FIGS. 12 and 13 illustrate a photodetector array and truth table for sensing characters colored in accordance with the format of FIG. 11. The detection elements in this array along with the signal generating means for each of the elements of the array are shown in FIG. 16 and have been described in detail hereinbefore. The colors represented in FIG. 12 refer to the color filter strip which is to be employed with the associated column of photocells. In this instance, the color filter strips are red, green and blue. By referring to the truth table of FIG. 13, it can be seen that a magenta color code in a particular band will be sensed when outputs are generated by photocells having red and blue filters. Similarly, a cyan color code will be sensed by outputs from photocells having green and blue filters while white will be sensed by outputs from each of the photocells whereas black will be sensed by the absence of outputs from each of the cells in a band.

A white output signal for each of the bands in the format of FIG. 11 is provided by the logic circuit of FIG. 14 wherein AND gates 184, 186, 188 and 190 are associated with the bands 12, 14, 16 and 18 respectively. Inputs to each of these AND gates comprises the output signals from the red, green and blue photosensing cells for each of the associated bands. A black output signal is provided for the bands by inverter amplifiers 192, 193, 194, 195, 196, 197, 198, 199, 200, 201, 202, and 203 for the bands and associated AND gate 204, 205, 206 and 207.

A plurality of AND gates 210, 212 and 214 for sensing and generating an output indication of the presence of the lower case characters a, d, and g respectively is provided. Each of these AND gates has applied thereto input signals derived from the detection elements and logic unit of FIG. 4 which is representative of the coding of a particular character as indicated in FIG. 11. An output will be provided by these AND gates when each of these input signals is present along with a timing signal which is provided by a timing signal generator 16. This timing signal generator operates in a manner similar to that described with respect to FIG. 8 and further elaboration is believed unnecessary. For purposes of simplifying the drawings and the disclosure, and AND gates for sensing the coding of the remaining alpha-numeric characters of the format of FIG. 11 are not shown. However, it is understood that they operate in a similar manner with input signals from the detector array as enumerated by FIG. 11. The signal from an output terminal of the AND gates is in the form of a voltage level or pulse which is employed to actuate other utility equipment or to set a memory device such as a bistable device, for example, for storing the information. The data can then be used in the data processing arrangement for interpreting the information. Although the recording medium provided by the PEP system of FIG. 9 has been described to be a transparent Mylar material having a conductive film upon which a positive image is formed, or a strip of tape 156 upon which a negative image is formed, the image may be transferred by pressure contact to a record medium of desired color for detection by the apparatus described with respect to FIGS. 12 through 15. This technique was referred to hereinbefore with respect to the record medium and employed for recording the characters of the format of FIG. 6.

A particular circuit arrangement for the AND gates of FIGS. 7, 8, 14 and 15 is illustrated in FIG. 17. Similarly, a particular circuit arrangement for the inverter amplifier circuits of FIGS. 7 and 14 is illustrated in FIG. 18. FIG. 17 illustrates a diode logic AND gate arrangement having a plurality of input diodes 218–224. This diode circuit is coupled to a transistor amplifier 226 which is normally biased to a saturated condition and collector output potential is thereby established near ground potential. The application of a positive potential to one or more but less than all of the diode input terminals will result in the transistor 226 remaining biased in a saturated state. However, when positive potential are simultaneously applied to each of the diodes, then the transistor 226 becomes reversed bias and is driven to cutoff. The output potential of the collector will then become relatively negative thereby driving an inverter amplifying transistor 228 from cutoff to saturation and generating a positive going output signal.

The inverter amplifier circuit arrangement of FIG. 18 includes a PNP transistor amplifying device 230 having a base electrode 232 to which an input signal is applied through a speed up network 234. This amplifier is biased by a driver amplifier having an output signal which is to be inverted. A typical example of coupling this is illustrated in FIG. 17 wherein the transistor 218 is biased by the amplifier 226.

A color coded character recognition system has thus been described which provides for coding a plurality of characters by dividing each of the characters into sectors and by providing predetermined color coding for the particular sectors of each character. A detection arrangement has been described for the detection of particular characters by sensing the color coding associated with particular bands and by generating output signals which are indicative of this coding and which are translated by logical circuits into representations of the characters sensed. A means for providing color coded characters comprises printing apparatus utilizing a multi-stripe ribbon which provides a color coding through relative motion with respect to the printing head. Photoelectrophoretic imaging apparatus has also been described for forming color coded characters.

Various modifications to the described system and apparatus will occur to those skilled in the art. For example, more or less code colors and code color bands can be employed in accordance with the number of characters in a set which are to be color coded.

While I have illustrated and described particular embodiments of my invention, it will be understood that various modifications may be made therein.

What is claimed is:

1. A method for forming coded characters which are recognizable both by an individual and a machine comprising impacting a printing character against a multi-color printing band, said band comprising two or more parallel colored strips, no two adjacent strips being of the same color, to create indicia corresponding to the shape of a character on a record member;

said characters being of a size relative to said band to intersect more than one but less than all the strips in said band when impacted against said band; and, shifting said characters and said band relative to one another in predetermined manner to code different characters with different color combinations or different color strip positions contained in the band.

* * * * *